United States Patent [19]

Mertzweiller nee Maillard et al.

[11] 4,090,001
[45] May 16, 1978

[54] COMPOSITIONS FOR DENATURING PAINTS, ESPECIALLY FOR CLEANING PAINTING CABINS

[75] Inventors: Anne-Marie Mertzweiller nee Maillard; Guy Etienne, both of Pont-a-Mousson, France

[73] Assignee: Air-Industrie, Courbevoie, France

[21] Appl. No.: 743,906

[22] Filed: Nov. 22, 1976

Related U.S. Application Data

[63] Continuation of Ser. No. 454,704, Mar. 25, 1974, abandoned.

[30] Foreign Application Priority Data

Mar. 28, 1973    France .................. 73.11107

[51] Int. Cl.² .......... B08B 7/00; C09D 9/04; C11D 1/66; C23D 17/00
[52] U.S. Cl. .................. 427/444; 134/10; 134/38; 210/45; 252/135; 252/156; 252/DIG. 1; 427/230; 427/331; 427/345; 427/352
[58] Field of Search .......... 252/135, 156, DIG. 1; 134/38, 40, 34, 10; 210/44, 45; 427/345, 352, 331, 230, 444; 98/115 SB

[56] References Cited

U.S. PATENT DOCUMENTS

| | | | |
|---|---|---|---|
| 2,739,903 | 3/1956 | Arnold | 117/102 R |
| 3,021,372 | 2/1962 | Dupre | 252/156 X |
| 3,173,879 | 3/1965 | Arnold | 106/287 PR |
| 3,249,533 | 5/1966 | Fowler | 210/44 |
| 3,294,693 | 12/1966 | Dupre | 252/135 |
| 3,382,178 | 5/1968 | Lissant | 252/135 |
| 3,382,285 | 5/1968 | Egan | 252/135 X |
| 3,515,575 | 6/1970 | Arnold | 106/287 |
| 3,707,506 | 12/1972 | Lozo | 252/89 X |
| 3,723,146 | 3/1973 | Tupper | 106/287 P |

OTHER PUBLICATIONS

"Tergitol Surfactants", Bulletin of Union Carbide Co., 1959, pp. 4 & 25.

*Primary Examiner*—Dennis L. Albrecht
*Attorney, Agent, or Firm*—Larson, Taylor and Hinds

[57] ABSTRACT

The composition contains an alkaline agent and a polyether of the formula

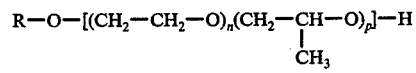

in which R is an alkyl, aryl-alkyl, aryl or alkyl-aryl group; and $n$ and $p$ are integers, of which one can be 0, the sum $n + p$ being at least equal to 12. The composition is especially applicable to painting booths for automobile bodies.

12 Claims, No Drawings

COMPOSITIONS FOR DENATURING PAINTS, ESPECIALLY FOR CLEANING PAINTING CABINS

This is a continuation of application Ser. No. 454,704, filed Mar. 25, 1974, now abandoned.

The invention relates to new compositions for denaturing paints, and it relates more particularly, because it is in their case that its use seems to have the greatest advantage, but not exclusively, to compositions adapted to enable the cleaning, especially continuously, of painting booths for automobile bodies.

It is known that paint is generally applied by spraying on to automobile bodies which are made to pass through these booths, this type of application being hence accompanied by appreciable losses of paint, among other things by deposition on the walls of such cabins.

These deposits must be continuously removed if it is desired to avoid frequent interruptions of the operation of the booth, which have necessitated long and fastidious cleaning, especially by scraping, of the walls of the booth. To prevent the formation of these deposits, recourse has been had to trickling over the walls of the booth, a liquid composition, especially alkaline in nature, containing ingredients adapted to denature the paint, particularly to reduce the adhesive power of the paint particles, to entrain them into channels for their removal and/or tanks or vats positioned below the booths. As far as possible separation of the abovesaid liquid composition is effected inside these tanks and it can then be circulated. Particles of paint are entrained in the form either of a foam which floats on the surface of the liquid composition or of a mass which precipitates to the bottom of the tank.

Various types of alkaline denaturing compositions have already been proposed, containing among other things organic solvents, such as aliphatic or aromatic hydrocarbons or other ingredients, for example alkyl-ketones, in the presence of non-ionic wetting or emulsifying agents, among which are included condensation products of ethylene oxide and alcohols or alkyl phenols, these condensation products being representable by the general formula $X-O-[CH_2-CH_2-O]_nH$ in which X is an alkyl or alkyl-aryl group, the index $n$ being an integer which must however remain fairly low, particularly not exceed 8 and preferably remain below this value, to avoid difficulties resulting from the foaming power of these condensation products, which, as has been observed with those condensation products of the type whose use has already been proposed, increases with the value of the index $n$.

It has however been found, in practice, that known liquid denaturing compositions, are not entirely satisfactory.

In fact, the adhesive power of the paint is not totally destroyed, so that particles of paint adhere to the walls of the spraying booth and gradually form deposits having a particularly high cohesion. Thus it becomes extremely difficult to detach them without having recourse to improved mechanical means, requiring a stoppage of operation for restoration of the booth to proper condition. Besides, those of the particles which are entrained have too greater tendancy to remain in suspension in the denaturing compositions inside the abovesaid tanks, so that the desired separation inside the latter is often found to be impractical. This necessitates a constant supply to the booths of fresh denaturing compositions.

Moreover known denaturing liquid compositions are generally only suitable for the elimination of certain types of paint, so that the use, in a booth, of another type of paint, must then necessarily be accompanied by a change in the nature of the denaturing compositions used.

It is an object of the invention to overcome the difficulties which have been indicated above. It is a particular object of the invention to provide improved compositions more particularly in the form of denaturing solutions, which can be used efficiently for the denaturing of all primers or sizes and paints currently used in industry.

It is another object of the invention to provide compositions whereby it is unnecessary to modify the conditions of denaturation each time that the type of paint used in such booths is changed.

It is a further object of the invention to provide an improved method for purifying suspensions of paints. Other objects and advantages of the invention will become apparent from the general and detailed description which follows.

The denaturing compositions of the invention, which are aqueous solutions, are characterised in that they contain, in addition to one or several alkaline agents, a compound (which, in the following description, will be called "polyether" for convenience of language) having the following formula:

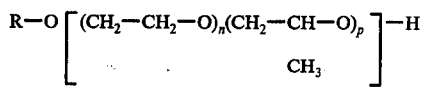

in which R is an alkyl, aryl-alkyl, aryl or alkyl-aryl group; and $n$ and $p$ are integers, of which one can be zero, the sum $n + p$ being at least equal to 12; and, if necessary, an anti-foaming agent.

The abovesaid ethers can be obtained in a manner known in itself, especially by the reaction of the alcohol or phenol ROH from which they are derived, with the corresponding number of molecules of ethylene and/or propylene oxide.

Groups of polyethers whose use is advantageous for the constitution of such denaturing solutions, are those which can be represented by one of the following formulae:

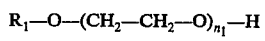

in which the group $R_1$ is an alkyl radical containing at least 12 carbon atoms and $n_1$ is at least equal to 16; or

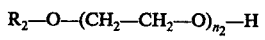

in which $R_2$ is an alkyl phenyl group, preferably octylphenyl, isooctylphenyl or nonylphenyl and $n_2$ is greater than 12, or

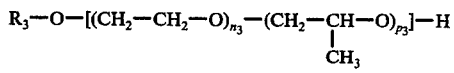

in which $R_3$ is an alkyl group containing at least 10 carbon atoms and the sum of the indices $n_3$ and $p_3$, both not zero, is at least equal to 12.

Preferably the polyethers used for the constitution of the abovesaid denaturation solutions contain at least 20, especially 20 to 100, glycolic ether groups of the type

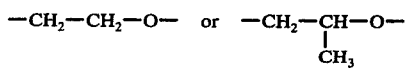

in their molecules. In other words, the polyethers of preferred denaturation solutions of the invention result from the reaction of 20 to 100 moles of ethylene oxide per mole of the corresponding alcohol or phenol.

As regards the alkaline agents used in the constitution of the denaturing compositions according to the invention, recourse may be had to the usual alkaline agents, such as for example hydroxides, silicates, phosphates, polyphosphates, borates, perborates, carbonates, etc. of an alkali metal, preferably sodium, although the corresponding hydroxides or salts of other alkali metals, such as lithium, potassium, cesium and rubidium can be used. They are for example used in amounts enabling adjustment of the pH of these compositions to values of the order of 10–12.

Advantageously the denaturing solutions according to the invention contain from about 2 to about 5 g/l, for example of the order of 3 g/l of the alkaline agent and about 1 to 3 grams per liter, preferably of the order of 1 gram per liter, of the abovesaid polyether. It is observed, especially in cases where the polyethers used contain in their molecule 20 glycolic ether groups or more, that the compositions obtained form true solutions, the polyether being in fact completely soluble in water at the indicated concentrations, because of the large number of glycolic ether groups which its molecule contains.

It is noted that the foaming power of the ethers used does not constitute in fact an obstacle to their use in baths for the denaturation of paints, this foaming power passing moreover through a maximum for ethers containing about 20 to 25 glycolic ether groups and then diminishing rapidly when the number of glycolic ether groups contained in a molecule of ether increases even more.

It is observed also that this foaming power, which appears especially on the starting-up of installations, can be efficiently overcome by having recourse to anti-foaming agents used in low concentrations, ranging especially between some ppm and 1000 ppm, especially if care is taken to select it, either from among fatty esters of vegetal origin, which are very emulsifiable and very hydrophilic and which migrate to the water-paint interfaces, or from products based on mineral oil, of low solubility in aqueous media, which exert their effect particularly at the water-air interface.

The anti-foaming agent may be added at regular intervals of time in small amounts to the denaturing solution, rather than in a single addition which results in a considerable consumption of said anti-foaming agent. The additions of these small amounts of anti-foaming agents can besides often be interrupted, after the starting-up of the installation and when the working condition has become fully continuous.

The fact that the foaming power of at least certain of the polyethers which come within the scope of the invention no longer constitutes a considerable drawback with regard to their use for constituting denaturing solutions, must doubtless be attributed to their very high denaturing activity, compared with that, particularly mediocre, of polyethers only containing a low number of oxyethylene or oxypropylene groups. It is remarkable in this regard that the strong denaturing power of these polyethers renders it unnecessary in practice to have recourse to other active constituents in the constitution of the denaturing solution according to the invention, except for the abovesaid alkaline agents.

The compositions, more particularly the solutions, obtained can be used for the denaturing of all types of paint, especially automobile paint, as well as sizes or primers also used in this industry. In particular they are usable with success for the denaturing of glycerophthalic and acrylic paints, as well as epoxy primers, these paints and primers being representative of those which are the most difficult to denature.

These denaturing compositions of the invention not only reduce sufficiently the adhesive power of the paints to enable, especially, the continuous cleaning of painting booths, but also enable, either a satisfactory settling of these denatured paints in the midst of these solutions, or their retention in the foams floating on the surface of these solutions, so that the latter can be easily recirculated.

The invention relates also in this respect to a method for cleaning suspensions of paints — undenatured or previously denatured by another process — in aqueous solutions, such as the washing waters of such paints, especially of the type used in painting booths, which method is characterised in that there is added to these solutions, at least one of the abovesaid polyethers, in association with at least one alkaline agent and, if necessary, an anti-foaming agent.

Recourse is had, within the scope of this application, to these agents, at concentrations preferably equivalent to those proposed in the foregoing as regards paint denaturing compositions.

The use of these agents at this stage is particularly advantageous, especially in the case of stable suspensions of paints, whether denatured or not, for the purpose, either of easily recovering the liquid medium - which can then be reused for further washings - or of facilitating their destructive treatment, to reduce their polluting power.

Other characteristics of the invention will emerge also in the course of the following description of Examples given only by way of indication of denaturing compositions and of the application of the latter.

EXAMPLE 1

Into beakers of 600 ml, there are introduced 200 ml of an aqueous solution containing 0.6 g of soda and 0.2 g of polyethers identified respectively, in the Table below, by fatty alcohols or phenols and the numbers of molecules of ethylene oxide from which they have been obtained. There are then added to the beakers, with stirring, 2 g of paints also identified in the Table below, in the absence of any solvent. After standing for 48 hours, the following observations were made with respect to each of these beakers, as shown in the Table below:

— the appearance of the supernatant solution,
— the adherence of the denatured particles and the ease of their restoration into suspension, and
— the adhesive power of these particles, after pugging or kneading.

This Table establishes the excellence of the results relating to denaturation of the paints tested, and even of the primer, which is remarkable considering the well known fact that the treatment of primers is particularly difficult.

Examples 2 to 7 relate to tests carried out in experimental cabins. The anti-foaming agent used in Examples 4 to 7 is an anti-foaming agent of oily formulation, of non-ionogenic chemical character, without silicone.

TABLE

| Polyether | Concentration in g/l | Melamine modified glycerophthalic base paint | Melamine modified acrylic base paint | Alkyd modified epoxy base primer |
| --- | --- | --- | --- | --- |
| Product of the reaction of ethylene oxide with fatty alcohols | | | | |
| Alcohol with C16.C18, 22 molecules of ethylene oxide | 5 g | + + + | + + + | + |
|  | 2 g | + + + | + + + | + |
|  | 1 g | + + + | + + | + |
| Alcohol with C16.C18, 16 molecules of ethylene oxide | 5 g | + + | + + + | |
|  | 2 g | + + | + + + | |
|  | 1 g | + + | + + + | |
| Alcohol with C10.C12, 5 molecules of ethylene oxide 7 molecules of propylene oxide | 5 g | + + + | + + + | |
|  | 2 g | + + + | + + + | |
|  | 1 g | + + | + | |
| OMO alcohol with C13, 10 molecules of ethylene oxide 6 molecules of propylene oxide | 5 g | + + + | + + + | |
|  | 2 g | + + + | + + + | |
|  | 1 g | + + | + + | |
| Alcohol with C16.C18, 20 to 25 molecules of ethylene oxide | 1 g | + + + | + | |
| Product of the reaction of ethylene oxide on alkylphenols: | | | | |
| Nonylphenol, 13 to 16 molecules of ethylene oxide | 1 g | + + + | + + + | + + |
| Nonylphenol, 23 molecules of ethylene oxide | 5 g | + + + | + + + | + + |
|  | 2 g | + + + | + + + | + + |
|  | 1 g | + + + | + + + | + + |
| Nonylphenol, 30 molecules of ethylene oxide | 1 g | + + + | + + + | + |
| Nonylphenol, 100 molecules of ethylene oxide | 1 g | + + + | + + | + |

Key:
+ + + completely denatured paint, well dispersed, not adherent, not sticky after pugging.
+ + well dispersed paint, not adherent, slightly sticky after pugging.
+ well dispersed paint, not adherent, sticky after pugging.

EXAMPLE 2

Tests of the denaturation of paint were carried out in an experimental booth of 15 cm width equipped with a fan, with a washer and with a flow channel. There was trickled over the walls of the booth and through the channel, a denaturing solution formed by water containing 3 g/l of soda and 1 g/l of a polyether formed by the reaction of ethylene oxide with a nonylphenol (in the proportion of 23 molecules of ethylene oxide per mole of polyether). 500 liters of this denaturing solution were employed in this test.

41.5 kg of glycerophthalic paint diluted to 23% by a solvent based on xylene and butanol were sprayed, the flow rate of the gun being about 1 kg per hour.

To compensate for evaporation and aspiration of water by the fan, 310 liters of water formulated with 3 g/l of soda and 1 g/l of polyether were added in amounts averaging 50 liters. The amount of anti-foaming agent added in 53 hours of operation was 0.4 liter, the greatest part of this anti-foaming agent being consumed during the period when there was no spraying of paint.

The result of the test was satisfactory: the paint was very well denatured; it did not adhere to the walls of the booth and of the channel and did not stick after kneading. It was very finely divided. A small portion of the paint was recovered at the surface with the foam; another portion was in suspension in the denaturing solution and the greatest part was deposited at the bottom of the flow channel.

EXAMPLE 3

A test of short duration was carried out in the same experimental booth with the same paint and the same anti-foaming agent as in Example 2, having recourse however, this time, to a polyether formed by the reaction of ethylene oxide with a mixture of fatty alcohols containing 16 to 18 carbon atoms and 22 molecules of ethylene oxide per mole of polyether. The flow channel being short-circulated, the volume of denaturing solution at 3 g/l of soda and 1 g/l of polyether was only 100 liters.

About 1.5 kg of diluted paint was sprayed in 1 h.30. The amount of anti-foaming agent added in the course of the test was 20 ml. As in Example 2, the paint was well denatured and deposited to a great extent at the bottom of the booth.

After standing for 60 hours, the paint retained in the foam at the surface was still in well dispersed particles; that which was in suspension in the midst of the denaturing solution is also well dispersed; that which was deposited at the bottom of the booth was agglomerated during the period of standing in the form of a sheet which did not adhere in the least to the bottom of the booth and which broke up easily. By kneading this paint, a non-sticky mastic was formed which easily broke into crumbs.

EXAMPLE 4

A test similar to that of Example 2 was carried out in the same booth with the same polyether (reaction product of ethylene oxide (23 molecules) with a nonylphenol). The volume of denaturing solution used was 500 liters. This time, three new paints were tested:

a glycerophthalic paint diluted with 21% of a heavy solvent (aromatic solvent distilling between 187° and 212° C), an acrylic paint diluted with 22% of xylene, a primer diluted with 10% of light solvent (petroleum fraction equals mixture of 70% of an aromatic solvent distilling between 158° and 184° C and 30% of another aromatic solvent distilling between 187° and 212° C).

A consumption of 13 ml of an anti-foaming agent in an oily formulation was sufficient in the course of 8 hours of operation of the booth without paint spraying — 16 kg of diluted glycerophthalic paint were sprayed with a gun delivery rate of 3 kg/h. The paint was well dispersed, but it stuck slightly after kneading. This is due particularly to the fact that, the solvent being too heavy, it only evaporates very slowly, and thereby denaturation is hindered. On the other hand, this solvent plays the role of an anti-foaming agent, so that it is not necessary to add a special anti-foaming agent to the denaturation solution. After emptying and renewing the denaturing solution, 10.5 kg of acrylic paint were sprayed with a gun delivery rate greater than 2 kg/h. A part of the paint floated to the surface of the solution flowing into the channel; it was well dispersed, non-adherent, but stuck very slightly after kneading. That which was deposited at the bottom of the channel was well denatured. This paint playing to a slight extent the role of anti-foaming agent, limited the overall consumption of anti-foamer to 5 ml, in 5 hours of operation.

— After further emptying and renewing the denaturing solution, 7 kg of diluted primer were sprayed in 5 hours 15 min. Recourse was had to the same amount of anti-foaming agent as in the spraying of acrylic paint.

The primer was well dispersed; it was deposited to a great exent at the bottom of the flow channel. It did not adhere to the walls, but it was sticky after kneading immediately after spraying. On the other hand, after deposition for 15 hours, it no longer stuck at all after kneading and the denaturation was very satisfactory.

EXAMPLE 5

A trial was carried out in the same booth, with the same anti-foaming agent, the same volume of solution (500 l) and the same paints as in Example 4. However this time, the polyether, a product of the reaction of ethylene oxide with a nonylphenol, contained 30 molecules of ethylene oxide.

The glycerophthalic paint used previously was diluted with a lighter solvent (that indicated for the primer in Example 4). 11 kg of this paint were sprayed in 9 hours of operation. The denaturation was very satisfactory. The paint was well dispersed; it did not adhere to the walls of the booth and of the channel; it did not stick at all after kneading.

No addition of anti-foaming agent was necessary during the spraying, the paint and its solvent playing the role of anti-foaming agent.

— There were then sprayed, without previous emptying of the installation, 12 kg of acrylic paint diluted with 22% of xylene, in 7 h.20 min of operation. 4 ml of anti-foaming agent were added during this time.

The paint floated to a large extent and was well dispersed. After the solution had stood for 15 hours, this paint formed a skin at the surface which was removed and broke very easily. It had the appearance of a non-sticky mastic. Its denaturation, although not complete, was very satisfactory.

EXAMPLE 6

A test was carried out in the same booth, with the same anti-foaming agent, but a volume of solution of 375 liters, a part of the flow channel being by-passed.

This time, the polyether, product of reaction of ethylene oxide with a nonylphenol, contained in its molecule, 100 oxyethylene groups.

6 paints were sprayed into the solution, without the latter being renewed:
3 glycerophthalic paints,
2 acrylic paints,
1 primer.

Some milliliters of anti-foaming agent were added when the booth operated without spraying of paint.

An addition of 100 liters of denaturing solution was made in the course of the tests to compensate for losses. It was noted that the polyether used denatured the paints generally less well, but that it had a tendancy to make the paint float, which permitted rapid removal of the latter, especially in installations comprising a surface scraper or the like.

Tests were carried out under the following conditions:

— 11 kg of glycerophthalic paint used in Example 5 and diluted in the same way were sprayed firstly. A large part of this paint floated on the solution in the flow channel. It was well denatured and easily recoverable by scraping.

— 2.750 kg of acrylic paint used in Example 5 were sprayed. The larger part of this paint also floated. Its denaturation was moderate and was sticky after kneading, but it was easily removed by scraping.

— 5.500 kg of primer used in Example 4 was sprayed. Like acrylic paint, it floated partially. It was nontheless easily removed by scraping.

— 4 kg of a second glycerophthalic paint was sprayed. This paint floated also partially; it was nonetheless easily separated by scraping at the surface.

— 3.750 kg of glycerophthalic paint used in Examples 2 and 3, and diluted with 23% of a solution based on xylene and butanol, were sprayed. The paint floated to a large extent and was very well dispersed and denatured.

— 4.400 kg of a second acrylic paint were sprayed. This paint was diluted with 70% of solvent based on xylene and butanol. It floated almost entirely and was very well denatured.

The consumption of anti-foaming agent was practically nil in the course of these tests with paint spraying.

EXAMPLE 7

A test was carried out in a larger experimental cabin, of 1 m width, equipped with circular washing means and containing 9.7 m$^3$ of water supplemented with 3 g/l of soda and 1 g/l of a polyether, a product of the reaction of ethylene oxide with a phenol (each molecule of this polyether containing 23 groups of ethylene oxide).

On the operation of this booth without paint spraying, the consumption of anti-foaming agent was about 3.5 ml/h/m$^3$, the washing means being provided with a shield which reduced the formation of foam. Without the shield, 6 ml of anti-foaming agent per m$^3$ and per hour were necessary to avoid the formation of any foam.

After 8 hours of operation, 600 liters of water containing 3 g/l of soda and with 1 g/l of polyether were added to compensate for losses by evaporation and suction into the fan.

The three paints used in Example 4 were sprayed successively with a spray gun at a rate of about 15 kg/h. The following paints were successively sprayed, without having recourse to intermediate emptyings and to renewals of the denaturing solution:
- 100.6 kg of glycerophthalic paint diluted with 20% of light solvent (petroleum fraction indicated with respect to the primer in Example 4)
- 103 kg of acrylic paint diluted with 22% of xylene,
- 81 kg of primer diluted with 10% of light solvent (same petroleum fraction as above).

The solvents and viscosities of the diluted paints are those which are actually used in industry.

In the course of spraying the glycerophthalic paint the consumption of anti-foaming agent was nil, the paint and its solvent themselves forming an excellent anti-foaming agent. It was the same on spraying the primer.

The diluted acrylic paint had a moderate anti-foaming effect. In the course of its spraying, it was necessary to add to the denaturing solution 3.7 ml of anti-foaming agent per m³ and per hour, when the washing means was not provided with a shield.

In trials with these paints, a fairly small amount of denatured paint floated to the surface of the solution. It was well dispersed and well denatured. The solution itself contained about 6 g/l of denatured paint in suspension.

The greatest portion of the paint was collected at the bottom of the tank after emptying the installation. This deposit, which resulted from the mixing of three paints, did not adhere at all to the bottom of the tank and could be removed by means of a simple water jet. It was slightly sticky after kneading.

We claim:

1. In a method of substantially suppressing the adhesive power of paints, sizes or primers and of dispersing the same by bringing said paints, sizes or primers in contact with an aqueous alkaline denaturing solution, the improvement comprising employing as said alkaline denaturing solution an alkaline aqueous solution comprising an effective amount of a polyether having the formula:

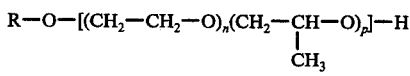

in which R is an alkyl, aryl-alkyl, aryl or alkyl-aryl, with at least 10 carbon atoms; and $n$ and $p$ are integers one of which can be 0, the sum $n + p$ being at least equal to 12 wherein the pH of said alkaline polyether solution is up to 12.

2. A method according to claim 1, wherein the polyether has the formula:

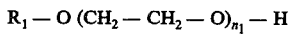

in which the group $R_1$ is an alkyl radical at least 12 carbon atoms and $n_1$ is at least equal to 16.

3. A method according to claim 1, wherein the polyether has the formula:

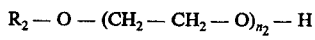

in which $R_2$ is an alkyl-phenyl group and $n_2$ is greater than 12.

4. A method according to claim 1, wherein said polyether has the formula:

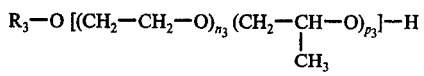

in which $R_3$ is an alkyl group and the sum of the indices $n_3 + p_3$ both other than 0, is at least equal to 12.

5. A method according to claim 1, wherein said polyether contains in its molecule between about 20 and about 100 glycolic ether groups.

6. A method according to claim 1, wherein the concentration of polyether in said alkaline aqueous solution is from about 1 and about 3 g/l.

7. A method according to claim 1, wherein the concentration of polyether in said alkaline aqueous solution is from about 1 to about 5 g/l.

8. A method according to claim 1, wherein the alkaline agent is constituted by a hydroxide, a silicate, a phosphate, a polyphosphate, a borate, a perborate or a carbonate of an alkali metal.

9. A method according to claim 1, wherein the aqueous solution contains up to about 1000 ppm of an anti-foaming agent consisting of fatty esters of vegetal origin or of mineral oils.

10. In a method of preventing formation of paint, size or primer deposits on the walls and bottom of paint booths during use by applying to said walls and bottom an aqueous alkaline denaturing composition, the improvement comprising employing as said alkaline denaturing composition an alkaline aqueous solution comprising an effective amount of a polyether compound having the formula:

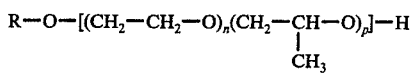

in which R contains at least 10 carbon atoms and is selected from an alkyl, aryl-alkyl, aryl or alkyl-aryl group, and $n$ and $p$ are integers of which one can be 0, the sum $n + p$ being at least 12.

11. A method according to claim 10, wherein the processed paint, size or primer dispersed in said solution is further allowed to settle to remove at least partially said denatured paint, size or primer from the solution which may be recirculated.

12. A method according to claim 10, wherein said solution contains about 2 to about 5 g/l of an alkaline agent.

* * * * *